United States Patent Office 3,173,890
Patented Mar. 16, 1965

3,173,890
STABILIZATION OF CRYSTALLINE POLYMERS
WITH THIOBIS-DIALKYL PHENOLS
Ival O. Salyer and Allen S. Kenyon, Dayton, Ohio, assignors to Monsanto Company, a corporation of Delaware
No Drawing. Filed Nov. 20, 1957, Ser. No. 697,542
19 Claims. (Cl. 260—45.95)

This invention relates to polymers of α-monoolefin hydrocarbons having a single hydrogen on β-carbon, which polymers in unoriented form exhibit crystallinity by X-ray diffraction, and the protection of same against the adverse effects of thermal processing on mechanical and eletctrical properties thereof.

Most of the long-known polymerization catalyst systems, when applied to olefin hydrocarbons other than ethylene, e.g., propylene, styrene, etc., result in the production of amorphous polymers. Some of these are of sufficiently high molecular weight to be useful as thermoplastic resins, while with others it is difficult or impossible to obtain such resins and the polymers are liquid or gummy materials of limited usefulness. It is possible, however, especially with some of the newer catalyst systems, to polymerize propylene, styrene or other α-monoolefin hydrocarbons having a single hydrogen on β-carbon, to yield polymers that are not only solid but that exhibit crystallinity (as determined by X-ray diffraction) even when the polymer is not stretched or otherwise oriented. Of particular interest at the present time are crystalline polypropylene, crystalline poly-1-butene, and crystalline polystyrene. The crystallinity of polymers of the type described is due to the stereospecific configuration of the polymer chain. Polymers of α-olefins, such as propylene and styrene, which have been termed "isotactic," and other varieties of stereospecific configuration, for instance polymers that have been called "syndiotactic," are encompassed by our invention.

Polymers of α-monoolefin hydrocarbons having a single hydrogen on β-carbon and which polymers in unoriented form exhibit crystallinity by X-ray diffraction, can be made, for example, by polymerizing such α-monoolefin hydrocarbons in the presence of a type of catalyst advanced by Prof. Dr. Karl Ziegler of the Max Planck Institute at Mulheim, Ruhr, Germany. Probably the preferred group of these catalysts is that disclosed in Belgian Patent No. 533,362, issued May 16, 1955, to Ziegler, the use of which as well as other related catalysts, to polymerize propylene, styrene and in general α-olefins of three or more carbon atoms is disclosed in Belgian Patent No. 538,782. Polymers of the type with which the present invention is concerned can also be made by the process advanced by Phillips Petroleum Company, of Bartlesville, Oklahoma, as described for example in Australian patent applications 864/54 and 6,365/55, which correspond respectively to Belgian Patents 530,617 and 535,082. A number of various catalysts have been described by the Standard Oil Company of Indiana, which can be used to produce these polymers of α-monoolefin hydrocarbons having a single hydrogen on β-carbon, which polymers in unoriented form exhibit crystallinity, for example, the so-called hydroforming catalyst, which are mainly supported oxides of metals of Group VI of the Periodic System, especially the group of chromium, molybdenum and tungsten, usually pre-reduced with reducing gases at elevated temperatures or activated by treatment with metal alkyls, lithium aluminum hydride and the like.

The monomeric olefins, whose crystalline polymers are the subject matter of the present invention, can be designated generally by the structural formula:

where R is a monovalent hydrocarbon radical. As a result of polymerizing such olefins, there results a polymer in which every other carbon atom in the backbone of the polymer chain is asymmetric and carries a tertiary hydrogen atom. Thus, such polymers can be given the general description of a high polymer of repeating units of the formula:

where R is hydrocarbon. In any event, the invention is concerned with polymer compositions comprising such polymers that are stereo-specific and accordingly exhibit, even in the unoriented form, crystallinity by X-ray diffraction. In the foregoing formulae, R can, of course, be alkyl, cycloalkyl, or aryl, which terms include mixed radicals such as aralkyl, cycloalkyl, alkyl, alkyl cycloalkyl, aryl cycloalkyl, alkaryl and cycloalkaryl radicals. By way of example of suitable R's there may be mentioned: methyl, ethyl, n-propyl, isopropyl, the various butyl, amyl, etc. radicals, 1-cyclohexylethyl, 2-cyclohexylethyl, benzyl, 1-methylcyclopentyl, 2-methylcyclopentyl, phenylcyclohexyl, phenyl, o-tolyl, m-tolyl, p-tolyl, cyclohexylphenyl.

The presence of polymer chains which are stereospecific and thus crystallizable, can be readily determined by X-ray diffraction measurements on the polymer in unoriented form, in the manner thoroughly familiar to those skilled in the art. (It may be pointed out that we are not here concerned with amorphous polymers, such as polyisobutylene, natural and various synthetic rubbers, and the like which are not crystalline at all yet which, by orienting the molecules as by stretching, can be caused to develop a crystallinity detectable by X-ray diffraction.) It should also be pointed out that the polymers with which we are concerned also exhibit crystallinity when in the oriented form, but the significant feature in characterizing same is that even in the unoriented form they exhibit crystallinity. While X-ray diffraction is the most definitive procedure, it is also possible, except in circumstances where the crystalline polymer is present in too small an amount or is otherwise inhibited from forming crystallities of visual size, to observe crystallinity by placing the polymer on a hot stage of a polarizing light microscope; the temperature at which the crystallites disappear (disappearance of so-called Maltese cross) is readily observed and is called the crystal melting point.

By way of example of the polymers with which this invention are concerned, the following are noted, together with the approximate crystal melting point: polypropylene, 165° C.; polybutene-1, 120° C.; polypentene-1 70° C.; polyhexene-1, −55° C.; polyheptene-1, −40° C.; polyoctene-1, −38° C.; polydodecene-1, 145° C.; polyoctadecene-1, 170° C.; poly-4-methylpentene-1, 235° C.; poly-3-methylbutene-1, 300° C.; poly-4,4-dimethylpentene-1, 320° C.; polystyrene, 230° C.; polyvinylcyclohexane, 325° C.

Because of their more practical value, as well as the fact that higher temperatures are required for thermal processing hence making more severe the problems to be discussed and which problems are alleviated by the practice of the present invention, the invention is most preferably applied to those polymers of the class described herein having a crystal melting point of at least 100° C., and especially within the range of 100–250° C.

Crystalline polymers as described herein, whether obtained by Ziegler, Phillips, or Standard of Indiana catalysis or by other heterogeneous catalyst systems, or in fact by any process independently of what particular catalyst may be employed, are extremely susceptible to deterioration of electrical and overall physical properties on thermal processing. While a certain amount of oxidative cross-linking undoubtedly occurs on thermal processing, the predominant effect is that of scission of the polymer chain. The fact that every other carbon atom in the polymer chain carries a tertiary hydrogen atom is considered a prime causative factor in this susceptibility to degradation on thermal processing. Further, the high crystal melting point of many of the polymers, requiring either higher processing temperatures or causing the polymer to be less fluid and thus undergo more shear than amorphous polymers at conventional conditions of processing, is also an important cause of susceptibility to degradation results in a decrease in the average molecular weight of the polymer material. This scission no doubt accounts for some of the adverse effects on physical properties, such as loss of tensile and impact strength, loss of melt extensibility, and increased flowability at a given temperature and pressure. While it is sometimes advantageous to increase the flowabality of polymers, with a given polymer this is accompanied by a loss of the tensile properties, which of course is undesirable. Further, it takes very little thermal processing indeed to cause these crystalline polymers to increase in flowability to an undesirable extent. It may be mentioned by way of contrast that crystalline polypropylene, for example, with a given amount of thermal processing is much more drastically and severely degraded than is polyethylene, either conventional polyethylene or highly linear polyethylene such as prepared by the Ziegler or other catalysts suitable for preparing crystalline polypropylene. In addition to these and other undesirable changes in the physical properties, the excellent electrical properties are degraded, as demonstrated by marked increase in the dissipation factor of the polymer. This is believed to be due to take up of oxygen in the molecule which occurs on thermal processing, and very little oxygen indeed is needed to markedly reduce the value of these crystalline polymers for electrical insulation purposes. This is particularly true at high frequencies, where the polymers are valuable as dielectrics and insulating materials.

In accordance with the present invention, a polymer of an α-monoolefin hydrocarbon having a single hydrogen on β-carbon, said polymer in unoriented form exhibiting crystallinity by X-ray diffraction, has incorporated therein a small amount of a sulfide of a dialkylphenol. The amount is sufficient to provide at least some protection to the polymer against the effects of thermal processing. Such small but protective amount will be within the range of 0.005 to 5 weight percent, based on the weight of the polymer composition, and preferably from 0.01 to 0.5 weight percent. The sulfides of dialkyl phenols are believed to protect residual double bonds or other portions of the crystalline polymer molecule, especially the tertiary hydrogen atoms, from the adverse effects of contact with oxygen at elevated temperatures and of shearing to which the molecules are subjected on thermal processing, and particularly against oxidative scission of the polymer chain.

Preferred are the mono- and disulfides of dialkyl phenols. All those classes of compounds disclosed in U.S. Patent 2,364,338 to Beaver, and in U.S. Patent 2,670,382 to Downey and Zerbe, are very suitable. Of especial interest because of their ability to obtain the desired effect when used even in very small quantities, are the materials which can be described as a sulfide of a monohydric dialkylphenol in which a carbon atom of each two nuclei of the phenol are joined together by less than three sulfur atoms and each of the alkyl groups contain less than six carbon atoms and at least one alkyl group is a branched chain alkyl group and which is unsubstituted, except for sulfur, in two of the positions ortho- and para- to the hydroxy group. Preferred are sulfides of alkyl cresols in which the alkyl radical contains up to 12 carbon atoms, and in particular is a branched chain alkyl radical containing less than six carbon atoms. For example 4,4′-thiobis-(6-tert.-butyl-m-cresol), which can also be properly named di(1-hydroxy-3-methyl-6-tert.-butyl-phenyl) monosulfide, available commercially under the trademark Santowhite Crystals, is outstanding. Other dialkyl phenol sulfides available commercially include Santowhite L which is essentially thiobis-(di-sec.-amyl phenol) and Santowhite MK which is a liquid reaction product of 6-tert.-butyl-m-cresol and $SCl_2$. With respect to dialkyl phenol sufides in general, it is preferred that neither alkyl group contain more than 12 carbon atoms. Preferably each alkyl group contains less than 6 carbon atoms and at least one is branched chained, of which the tertiary alkyl groups are most commonly used, e.g., tert.-butyl, tert.-amyl.

While, for the sake of convenience, the discussion in the present application is principally directed to sulfides of dialkyl phenols wherein in a single molecule both the dialkyl phenol residues are of the same structure, it will be appreciated that sulfides wherein the two dialkyl phenol residues have different structures are also contemplated although such compounds are not as conveniently made. Sulfides of dialkyl phenols are conveniently obtained by the action of sulfur monochloride ($S_2Cl_2$) or sulfur dichloride ($SCl_2$) on the dialkyl aromatic hydroxy compound. When convenient or desirable other methods of synthesis may be used, and it is to be understood that this invention is not limited to any particular method of synthesis but pertains broadly to the use of the materials described. However, it may be pointed out that since more than one position at which the surfur may attach to the ring is available, more than a single reaction product may be formed, and it is within the preview of this invention to employ the composite reaction products as well as pure individual compounds. For example, thymol and carvacrol react readily with sulfur dichloride in an organic solvent to produce crystalline solids M.P. (purified) 152–153° C. and 171–172° C., respectively, and minor amounts of other material which remains in the organic solvent. If the solvent is evaporated off without separating the crystalline solid, a composite resinous reaction product remains which is effective in the practice of the invention. Similarly, 4-tertiary butyl meta cresol reacts with sulfur dichloride in ether solution producing a crystalline solid melting at 157–158° C. and an even larger proportion of resinous reaction product. Again, the composite reaction product as well as the pure crystalline compound, can be incorporated in the polymer in the practice of the invention.

One suitable method of preparation comprises adding a solution of sulfur monochloride or dichloride in carbon tetrachloride or other suitable solvent to a rapidly stirred solution of the dialkyl phenol in the same solvent. The reactions are usually instantaneous and take place with little evolution of heat. The mixture is then cooled to precipitate out the crystalline material and filtered, or where the product is a liquid or where it is desired to isolate the composite reaction product, the solvent is simply removed by evaporation or other suitable means. For example, sulfur dichloride is reacted in this manner with 1,3,5-xylenol, 3,5-dimethyl-4-chlorophenol, 6-tert.-butyl-metacresol, 3-dodecyl-cresol, and the like.

By way of example but not limitation, the following specific compounds can be named as examples of those which are incorporated in small amount with the polymer in the practice of the invention: di(1-hydroxy 3-methyl 6-isopropyl phenyl) monosulfide and disulfide, di(1-hydroxy 3-methyl 6-tertiary butyl phenyl) monosulfide and disulfide, di(1-hydroxy 2-tertiary butyl 5-methyl phenyl) monosulfide and disulfide, di(1-hydroxy 2-tertiary amyl 5-methyl phenyl) monosulfide and disulfide, di(1-hydroxy 2-methyl 5-isopropyl phenyl) monosulfide and disulfide, di(1-hydroxy 2-methyl 5-tertiary butyl phenyl) monosulfide and disulfide, di(1-hydroxy 2-methyl 5-tertiary amyl phenyl) monosulfide and disulfide, di(1-hydroxy 3-methyl 4-isopropyl phenyl) monosulfide and disulfide, di(1-hydroxy 3-methyl 4-tertiary amyl phenyl) monosulfide and disulfide, di(1-hydroxy 3-tertiary butyl 4-methyl phenyl) monosulfide and disulfide, di(1-hydroxy 3-isopropyl 4-methyl phenyl) monosulfide and disulfide, di(1-hydroxy 3,6-ditertiary butyl phenyl) monosulfide and disulfide, di(1-hydroxy 2,5-ditertiary butyl phenyl) monosulfide and disulfide, di(1-hydroxy 2-methyl 3-isopropyl phenyl) monosulfide and disulfide, di(1-hydroxy 2-methyl 3-tertiary butyl phenyl) monosulfide and disulfide, di(1-hydroxy 3,5-ditertiary butyl phenyl) monosulfide and disulfide, di(1-hydroxy 3-methyl 5-isopropyl phenyl) monosulfide and disulfide, di(1-hydroxy 3-methyl 5-tertiary butyl phenyl) monosulfide and disulfide, di(1-hydroxy 3-methyl 5-tertiary amyl phenyl) monosulfide and disulfide, di(1-hydroxy 3-methyl 4-secondary butyl phenyl) monosulfide and disulfide, di(1-hydroxy 3-methyl 4-isoamyl phenyl) monosulfide and disulfide. Further examples of suitable compounds which are in general however less efficacious in the practice of the invention are: di(1-hydroxy 3-methyl 6-n-octyl) monosulfide and disulfide di(1-hydroxy 3-methyl 6-methyl phenyl) monosulfide and disulfide, di(1-hydroxy 2-methyl 4-tertiary butyl phenyl) monosulfide and disulfide, di(1-hydroxy 2-hexyl 5-hexyl phenyl) monosulfide and disulfide, di(1-hydroxy 3-methyl 4-chloro 5-tertiary amyl phenyl) monosulfide and disulfide. Dialkyl phenol sulfides can be used which contain hydrocarbon groups other than alkyl, e.g., benzyl, phenyl, or non-hydrocarbon groups, e.g., chloro, that do not interfere with the desired effect of the dialkyl phenyl sulfides on the polymers. The sulfur bridge is usually para to the hydroxyl group, but the invention is not limited thereto. It will, of course, be understood that some differences will be found in the actions of these dialkyl phenol sulfides and that the various ones are not necessarily the full equivalents of each other in the practice of the invention.

The following structural formula can be used to represent a preferred group of dialkyl phenol sulfides

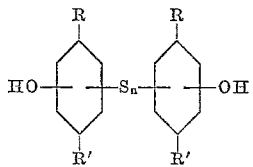

where R and R' are alkyl radicals containing up to 12 carbon atoms and $n$ is an integer less than 3, and preferably where R and R' are alkyl groups of less than 6 carbon atoms at least one alkyl group on each nucleus being a branched-chain alkyl group.

Sulfides of alkyl cresols are especially preferred, particularly those having the following structure

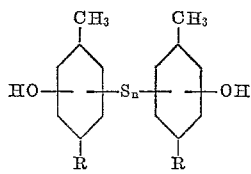

where R is an alkyl radical containing up to 12 carbon atoms and $n$ is an integer less than 3, and more preferably where R is a branched-chain alkyl radical containing less than 6 carbon atoms.

It should be pointed out that polymers of $\alpha$-monoolefin hydrocarbons having a single hydrogen on $\beta$-carbon and which polymers in unoriented form exhibit crystallinity by X-ray diffraction, may be obtained largely or completely in the form which is crystalline or crystallizable, but that in ordinary methods of synthesis it is frequently difficult and often undesirable to separate the crystalline material from the amorphous polymer concomitantly formed. Thus, it may be desirable to isolate a crystalline polypropylene or crystalline polystyrene containing not more than 5 or 10 or 20 percent amorphous polymer. On the other hand, for many uses it may be possible and even preferable to permit the inclusion of much larger amounts of the amorphous polyproylene or polystyrene, or even add amorphous polypropylene or polystyrene from extraneous sources, either prepared by the same general type of catalysis or prepared by entirely different methods. It will also often be desirable to include different, usually but not necessarily amorphous, polymers and/or include plasticizers. Polymer compositions containing the crystalline polymer in any of the thus diluted forms retain advantages of the crystalline polymer phase, yet may be much more easliy processed. It should be pointed out, however, that the crystalline form of the polymer, even if present in only minor amounts, is still subject to severe deterioration on thermal processing, which deterioration is alleviated by incorporating a dialkyl phenol sulfide in the composition.

Those skilled in the art are familiar with a variety of methods for incorporating small amounts of any additive into polymers; hence, a detailed description is not considered necessary. It may be pointed out, however, that the dialkyl phenol sulfide should be intimately admixed with the crystalline polymer to be protected, and this can be done by milling it in on hot or cold (i.e., not deliberately heated) mill rolls, by mixing it in by the use of Banbury mixers or other well-known devices of this nature, or it may be mixed with polymer that is in the form of molding powder and incorporated during extrusion or during injection molding, or it may be incorporated into a solution of the polymer which solution may then be employed for the formation of films, for wet or dry spinning of fibers, monofilaments and the like. The dialkyl phenol sulfides may be added as such or may first be dissolved in a suitable solvent, e.g., methanol, ethanol, benzene, toluene, as the particular mixing procedure warrants. A masterbatch of the dialkyl phenol sulfide and polymer to be protected, or for that matter other polymer either crystalline or amorphous if it should be desired to admix same with the crystalline polymer to be protected, can be prepared which contains a comparatively high percentage of the dialkyl phenol sulfide, e.g., 1%, 10% or more by weight of the composition, then the necessary quantity of the masterbatch can be incorporated with the crystalline polymer on mill rolls or otherwise; this procedure is particularly desirable for insuring thorough admixture. In any event, it is quite desirable to incorporate the dialkyl phenol sulfide with the polymer to be protected when the latter has undergone as little thermal processing as possible. It will be understood of course that the various polymers with which the present invention is concerned have a great variety of uses and that in applying same to such uses they can have added thereto a great variety of other materials, such as lubricants, fillers, dyes, pigments, reinforcing agents, other polymers either amorphous or crystalline, plasticizers, softeners, tackifiers, other stabilizers and the like. The dialkyl phenol sulfide can be incorporated into the crystalline polymer before, during or after the incorporation of such other materials therein.

Further details will now be given with respect to some of the more important catalyst systems that can be employed to produce crystalline polymers of α-monoolefin hydrocarbons having a single hydrogen on β-carbon.

It will be seen that a large variety of materials can be employed in the formation of a Ziegler catalyst. It is generally considered that the Ziegler catalysts are best obtained by interaction of a polyvalent metal compound with another metal in elemental or combined form resulting in reduction of the valence state of the first said metal. The polymetal Ziegler catalyst is believed to act as a heterogeneous catalyst, i.e., at least some of the product obtained by the interaction of the materials in question is present in solid form although often in such finely divided form as to be of colloidal or sub-colloidal particle size. The Ziegler catalyst can be employed in the absence of any extraneous liquid suspending agent, such as a liquid inert hydrocarbon, e.g., kerosene, but is more often employed in the form of a colloidal solution or suspension in such a liquid.

As pointed out before, probably the preferred group of Ziegler catalysts is that disclosed in Belgian Patent No. 533,362, issued May 16, 1955, to Karl Ziegler, the disclosure of which is hereby incorporated herein by reference, namely catalysts prepared by the interaction of a trialkylaluminum with a compound of a metal of Group IV–B, V–B or VI–B of the Periodic System, including thorium and uranium, and especially compounds of titanium, zirconium and chromium. These, and the variety of other catalysts of the Ziegler type, can be considered exemplified by the catalyst obtained by the interaction of a trialkylaluminum with titanium tetrachloride. Other catalysts of the Ziegler type differ from those disclosed in the above-mentioned Belgian Patent No. 533,362 in various ways, for example, as follows: Instead of or in addition to the aluminum trialkyls, catalysts of the type described in the Belgian patent can be made by reacting the various metal compounds of Groups IV–B, V–B and VI–B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydride, alkyl or aryl aluminum dihalides, alkyl or aryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these of course being reacted with compounds of Groups IV–B, V–B or VI–B metals. Another Ziegler type catalyst is prepared by the interaction of an aluminum compound of the general formula $R_2AlX$ where R is a hydrocarbon radical such as alkyl or aryl, and X is a halogen, such as chlorine or bromine, with a compound of a metal of Group VIII of the Periodic System, e.g., iron, nickel, cobalt, or platinum, or manganese, for example dimethylaluminum monobromide plus ferric chloride, diisobutylaluminum chloride plus nickel (trivalent) chloride, diethylaluminum monochloride plus manganic chloride. Yet another combination is that of the Group IV–B, V–B or VI–B metal compounds with aluminum compounds of the general formula $R_2AlX$, where R is hydrogen or a hydrocarbon radical and X is the radical of a secondary amine, a secondary acid amide, a mercaptan, a thiophenol, a carboxylic acid, or a sulfonic acid, e.g., piperidyl diethylaluminum plus $TiCl_4$, dimethylaminodiethylaluminum plus zirconium tetrachloride, ethylmercaptodiethylaluminum plus $TiCl_4$. Another of the classes of Ziegler type polymerization catalysts comprises compounds of the Group IV–B, V–B and VI–B heavy metals as previously mentioned, combined with the alkali metal alkyls, for example with lithium-, sodium-, or potassium methyl, -ethyl, -benzyl, -isobutyl, or with complex compounds of such alkali metal alkyls with organic compounds of aluminum, magnesium or zinc as mentioned above, or complex compounds of alkali metal hydrides with such organic compounds of aluminum, magnesium or zinc, for example butyl lithium plus zirconium tetrachloride, sodium tetramethylaluminum plus titanium tetrachloride or plus thorium acetylacetonate. Other Ziegler-type catalysts are prepared by using (in conjunction with compounds of Group IV–B, V–B and VI–B metals), instead of trialkylaluminums, triaryl-, triaralkyl-, trialkaryl- or mixed alkyl- and aryl-aluminum, zinc, magnesium or alkali metals, e.g., phenyl sodium plus $TiCl_4$.

Those skilled in the polymerization art having knowledge of these matters, refer to catalysts of the foregoing type as Ziegler or Ziegler-type polymerization catalysts, and to polymers prepared by their action as Ziegler or Ziegler-type polymers, the terms "Ziegler" and "Ziegler-type" being used synonymously. While the principal classes of such catalysts have been listed, this listing is not to be construed as complete, and various other catalysts than those set forth may also be used to produce crystalline polymers which, in accordance with the invention of the present application, are protected with dialkyl phenol sulfides. Thus, propylene, styrene, and other α-olefins having a single hydrogen on β-carbon, can be polymerized by catalysts obtained by treating compounds of heavy metals, especially compounds of the Group IV–B, V–B and VI–B metals, not with organo-metallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture, and compounds containing active hydrogen atoms as determined by the Zerewitinoff Method. Attention is further directed to the teaching of various of the foregoing catalysts in Ziegler's Belgian Patents 534,792 and 534,888, the disclosures of which are hereby incorporated herein by reference. Still another disclosure incorporated herein by reference is that of Ziegler's Australian patent application 13,453/55, opened to public inspection May 10, 1956, and now Australian Patent 215,155, which teaches catalysts prepared by the interaction of (a) compounds of Group VIII metals or manganese with (b) organo-metallic or organo-metal-halide compounds of Group I, II or III metals. Many of the earlier Ziegler disclosures were directed mainly to the polymerization of ethylene, but most of the catalysts effective for ethylene polymerization are also effective, at least to some extent, in polymerizing α-olefin hydrocarbons having a single hydrogen on β-carbon to produce polymers that exhibit crystallinity in unoriented form. However, catalysts optimum for production of such crystalline polymers are apt to differ somewhat from those optimum in ethylene polymerization, e.g., in components, ratios, valencies, preparation methods and the like. Attention is directed to South African patent application 3748/55, accepted and opened to public inspection May 23, 1956, filed by Prof. Ziegler jointly with the Montecatini Company of Italy, the disclosure of which is hereby incorporated herein by reference, for a detailed discussion and examples of the effects of some of the variables of catalyst preparation on the production of crystalline polymers of α-olefin hydrocarbons of 3 or more carbon atoms. Note also Ziegler and Montecatini, Belgian Patent 538,782, the disclosure of which is hereby incorporated herein by reference, which discloses production of crystalline polymers of α-olefins of the general formula R—CH=CH$_2$ in which R represents alkyl, cycloalkyl or aryl, by use of catalysts obtained by the reaction (considered, at least partially, as reduction) of metal compounds selected from the left-hand column of the fourth to the sixth group of the periodic system of elements, including thorium and uranium groups, with metals, alloys, metal hydrides or metal-organic compounds selected from the first to third group of the periodic system of elements. The essence of the present invention, however, is not to be found in the particular Ziegler or other types of polymerization catalysts employed in making the crystalline polymers in question, but rather in the stabilization of such polymers, particularly against adverse effects of thermal processing, by the use of dialkyl phenol sulfides.

The present invention is applicable to all polymers of α-monoolefin hydrocarbons having a single hydrogen on β-carbon, which polymers exhibit crystallinity in unoriented form, and of especial interest of course are such solid polymers of sufficiently high molecular weight to be useful in the plastics industry, but some of the benefits of the invention are obtainable with lower molecular weight semi-solid and waxy polymers which can be used, for example, in adhesives, as lube oil additives, as wax additives, polishes, etc. The preferred polymers have a molecular weight of at least 2,000 and preferably 10,000. Those polymers to which the present invention is applied with particular advantage generally have much higher molecular weights ranging from 20,000 to 50,000 or 100,000 and even in many cases as high as 1,000,000 to 3,000,000 or more. The molecular weights in question are those calculated in the conventional manner on the basis of the viscosity of the polymer in solution.

No matter what methods are used to purify Ziegler type polymers, they almost invariably contain at least traces of catalyst residues. Such residues are presently believed to be at least one of the causative factors of the stabilization problems discussed herein. It can also be pointed out that Ziegler polymers of α-monoolefin hydrocarbons as described herein, although largely saturated, do contain an appreciable number of double bonds in the polymer molecule, and it is believed that this unsaturation or perhaps at least the type of unsaturation contributes to the difficulties. Various other postulations can be made, but the present invention is not dependent on any particular theory, but is rather based on experimental observation. Ziegler type polymers as initially prepared generally have some color. When such polymers are subjected to thermal processing which is necessary to put the same in condition for most end uses, for example by hot milling, extrusion, injection molding, mixing with other materials to be used in a compounded polymer formulation, etc. a number of changes are observed to take place. One is the development of color, and in some instances the present invention minimizes this. Furthermore, adverse effects on the strength properties of the polymer are noted. Thus, the ultimate tensile strength of the crystalline polymer generally undergoes some adverse change on only a very limited amount of thermal processing, and with prolonged processing, which is often essential in the reuse of scrap from injection and compression moldings, a severe loss in tensile strength occurs. Similarly, the polymer is subject to marked loss of tensile elongation. Various other physical properties such as flexural deflection and impact strength are also adversely affected, and the ability of the polymer to flow to the desired extent, which of course is of much importance in injection molding, extrusion and like techniques, may become impaired. For example, the polymer melt may become too low in viscosity thus introducing problems of nozzle "drooling," sprue and die sticking, etc. As opposed to conventional non-crystalline polymers as prepared, say, by high pressure polymerization in the presence of oxygen as a catalyst, which tends to undergo oxidative cross linking on thermal processing, the crystalline polymers with which this invention is concerned are more prone to undergo oxidative scission of polymer chains resulting in a decrease in the average molecular weight of the polymer material. This scission no doubt accounts for some of the adverse effects on physical properties just mentioned.

More detailed information will now be given on preferred process conditions and catalysts for preparing Ziegler polymers. We prefer to polymerize the α-olefin in the presence of a catalyst prepared by the interaction of (a) an aluminum compound of the general formula R$_2$AlX wherein R is an alkyl, cycloalkyl or aryl radical and X is hydrogen, halogen or an alkyl, cycloalkyl or aryl radical, with (b) a metal halide selected from the group consisting of the chlorides, bromides and iodides of titanium and zirconium. The preparation of polymer will be described, by way of example, with particular reference to catalysts prepared by the interaction of trialkylaluminums, e.g., triethylaluminum, triisobutylaluminum, trioctylaluminum, with titanium tetrachloride.

Suitable aluminum compounds to be reacted with the chlorides, bromides or iodides of titanium or zirconium are those represented by the general formula R$_2$AlX wherein R is an alkyl, cycloalkyl or aryl radical and X is hydrogen, halogen, or an alkyl, cycloalkyl or aryl radical. By way of example, but not limitation, the following compounds are mentioned:

Triethylaluminum
Triisobutylaluminum
Trioctylaluminum
Didodecylocylaluminum
Diisobutylaluminum hydride
Tridodecylaluminum
Diphenylaluminum bromide
Dipropylcyclohexylaluminum
Ditolylmethylaluminum
Tri-(β-phenylethyl)aluminum
Diethylaluminum chloride
Diisobutylaluminum chloride
Diisobutylaluminum iodide
Di(β-cyclohexylpropyl)isobutylaluminum It is to be understood that mixtures of the foregoing types of aluminum compounds can be employed. One can use the total reaction mixtures obtained in the formation of such compounds, e.g., by treatment of metallic aluminum with alkyl halides resulting in the formation of such mixtures as R$_2$AlCl plus RAlCl$_2$, termed alkylaluminum sesquihalides.

The aluminum compounds in question are interacted with one or more chlorides, bromides or iodides of titanium or zirconium, the chlorides and iodides being preferred. The titanium or zirconium in these halides should be in a valence form higher than the lowest possible valence. The dihalides and trihalides are especially preferred, although the tetrahalides, and mixtures of di-, tri- and tetrahalides, etc., are also quite useful. Preferred titanium or zirconium compounds are those that are soluble in an oragnic solvent (preferably a hydrocarbon such as hexane, benzene, kerosene, etc.) that is used in preparing the catalyst. Titanium or zirconium compounds other than the named halides, e.g., those called alcoholates, alkoxides or esters by various investigators such as titanium tetramethoxide (also called tetramethyl titanate), titanium triethoxide, tripropoxytitanium chloride, zirconium tetra-n-butoxide, or fluorides of titanium or zirconium, or complexes such as zirconium acetylacetonate, K$_2$TiF$_6$, or salts of organic acids such as the acetates, benzoates, etc., of titanium and zirconium, can be used to prepare catalysts with at least some activity and to that extent can be considered equivalents of the halides; however, such compounds are usually prepared from the halides and hence are more costly, and also are usually less active, so their use is economically sound only where in a particular situation favorable effects can be obtained such as increased solubility in an organic solvent that is used in preparing the catalyst, or polymer of increased molecular weight, or faster reaction rate. Although the exact action resulting from contacting the aluminum compound with the titanium or zirconium compound is not understood, it is believed likely that the zirconium or titanium halide is reduced in valence by the reaction of the added aluminum compound. The mol ratio of aluminum compound to titanium (or zirconium) compound, or stated another and simpler way, the mol ratio of aluminum to titanium (or zirconium), can vary over a wide range, suitable values being from 0.1:1 to 10:1 on up to 15:1 or higher. It is generally preferred to use an Al:Ti mol ratio between 0.3:1 and 5:1. The same ratios apply in the case of the zirconium compounds.

While active catalysts can be prepared by a variety of procedures, the simplest and perhaps most effective is to add the titanium or zirconium halide to the aluminum compound, or vice versa, preferably though not necessarily in the presence of an inert organic solvent. Such solvents can suitably be saturated aliphatic and alicyclic, and aromatic hydrocarbons, halogenated hydrocarbons, and saturated ethers. The hydrocarbon solvents are generally preferred. By way of example can be mentioned liquefied propane, isobutane, normal butane, n-hexane, the various isomeric hexanes, cyclohexane, methylcyclopentane, dimethylcyclohexane, dodecane, industrial solvents composed of saturated and/or aromatic hydrocarbons, such as kerosene, naphthas, etc., especially when hydrogenated to remove any olefin compounds and other impurities, and especially those ranging in boiling point up to 600° F. Also, benzene, toluene, ethylbenzene, cumene, decalin, ethylene dichloride, chlorobenzene, diethyl ether, o-dichlorobenzene, dibutyl ether, tetrahydrofuran, dioxane.

It may also be mentioned here that the polymerization can readily be effected in the presence of any of the classes of solvents and specific solvents just named, as well as advantageously in the absence of any solvent. If the proportion of such solvent is kept low in the reaction mixture, such as from 0 to 0.5 part by weight inert organic solvent (i.e., inert to the reactants and catalysts under the conditions employed) per 1 part by weight total polymer produced, solvent recovery steps are obviated or minimized with consequent advantage. It is often helpful in obtaining efficient contact between α-olefin monomer and catalyst and in aiding removal of heat of reaction, to employ larger amounts of solvent, for example from 5 to 30 parts by weight solvent per 1 part by weight total polymer produced. These inert solvents, which are solvents for the α-olefin monomer and some of the catalyst components, but are non-solvents for some of the polymers, can also properly be termed inert liquid diluents.

The amount of catalyst required is dependent on the other variables of the polymerization reaction, and although amounts as small as 0.01 weight percent based on total weight of monomer charged are sometimes permissible, it is usually desirable to use somewhat larger amounts, such as from 0.1 up to 2 percent or even higher, depending upon the presence or absence of solvent, the temperatures, pressures, and other reaction conditions. When polymerization is effected in the presence of a solvent, the catalyst to solvent weight ratio should be at least about 0.003:1.

The polymerization can be effected over a wide range of temperatures, again the particular preferred temperature being chosen in accordance with the pressure, particular catalyst, particular monomer, and other reaction variables. Although room temperature or below may be used in some instances, higher temperatures appear to be optimum, say from 50 to 75° C. Temperatures ranging up to 100° C. and higher are generally satisfactory for Ziegler type polymerization of α-monoolefin hydrocarbons.

The pressure at which the polymerization is carried out is dependent upon a number of variables. In most instances, the polymerization is suitably carried out at atmospheric pressure or higher. Although sub-atmospheric pressures are permissible, there would seldom be any advantage. Pressures ranging from atmospheric up to several hundred or even many thousand pounds per square inch, e.g., 50,000 p.s.i. and higher, are suitable. While high pressures are not required in order to obtain the reaction, they will have, primarily with the gaseous olefins, a desirable effect on reaction rate and in some instances on polymer quality. The choice of whether or not to use an appreciably elevated pressure will be one of economic and practical considerations taking into account the advantages that can be obtained thereby.

The catalyst is sensitive to various poisons, among which may be mentioned oxygen, water, carbon dioxide, carbon monoxide, acetylenic compounds such as acetylene, vinylacetylene, alcohols, esters, ketones, aldehydes, and the like. For this reason, suitable precautions should be taken to protect the catalyst and the reaction mixture from such materials. An excess of the aluminum compound, particularly mol ratios of aluminum to titanium or zirconium in excess of about 4:1, tends to give a certain amount of protection against these poisons. The monomer, and diluents or solvents if used, need not be pure so long as they are reasonably free from poisons. However, best results are ordinarily obtained if the monomer feed contains at least 90 weight percent and preferably higher of the α-monoolefin hydrocarbon, exclusive of any solvent material. It is well to protect the catalyst during preparation, storage and use by blanketing with an inert gas, e.g., nitrogen, argon or helium.

The α-monoolefin hydrocarbon to be polymerized is contacted with the catalyst in any convenient manner, preferably by bringing the catalyst and olefin together with intimate agitation provided by suitable stirring or other means. The agitation can be continued during the polymerization, or in some instance the polymerization mixture can be allowed to remain quiescent while the polymerization takes place. In the case of the more rapid reactions with the more active catalysts, means can be provided for refluxing solvent if any of the latter is present, and thus remove the heat of reaction. In any event adequate means should be provided for dissipating the exothermic heat of polymerization. If desired, the lower boiling α-monoolefin hydrocarbons can be brought in vapor phase into contact with the solid catalyst, in the presence or absence of liquid solvent. The polymerization can be effected in the batch manner, or in a continuous manner, such as for example, by passing the reaction mixture through an elongated reaction tube which is contacted externally with suitable cooling medium to maintain desired reaction temperature.

The polymer will be recovered from the total reaction mixture by a wide variety of procedures, chosen in accordance with the properties of the particular polymer, the ratio of crystalline to amorphous polymer, the presence or absence of solvent and the like. It is generally quite desirable to remove as much catalyst from the polymer as possible, and this is conveniently done by contacting the total reaction mixture, or the polymer after separation from solvent, etc., with methanolic hydrochloric acid, with an aliphatic alcohol such as methanol, isobutanol, secondary butanol, or by various other procedures. Polymer that is insoluble in the solvent can be separated therefrom by filtration, centrifuging or other suitable physical separation procedure. Solvent can be removed from soluble polymer by evaporation. Polymer that is ordinarily insoluble can be dissolved in a hot hydrocarbon or other solvent, from which it is advantageously precipitated by cooling or by admixture of the solution with a non-solvent, such non-solvent usually being an organic liquid, e.g., methanol, miscible with the solvent but in which the polymer to be recovered is not readily soluble. Of course, any solvent present can also be separated from polymer by evaporation of the solvent, care being taken to avoid subjecting the polymer to too high a temperature in such operation. If a high boiling solvent is used, it is usually desirable to finish any washing of the polymer with a low-boiling material, such as one of the lower aliphatic alcohols or hexane, pentane, etc., which aids removal of the higher boiling materials and permits the maximum removal of extraneous material during the final polymer drying step. Such drying step is desirably effected in a vacuum at moderate temperature, preferably well below 100° C.

It is sometimes advantageous to have a small amount of a dialkyl phenol sulfide present during any one or more or all of the wash procedures described hereinbefore, i.e., the procedures by which catalyst is removed from polymer. For example, the dialkyl phenol sulfide can be present in an alcohol used to remove catalyst from the polymer, and/or any low boiling hydrocarbon used to wash the polymer between an alcohol treatment and a drying step. Preferably, no contact of polymer with air is permitted before the polymer is contacted with the dialkyl phenol sulfide in this manner. So long as the alcohol or other wash liquid is centrifuged, decanted, or filtered off from the polymer, which is the usual case, some of the added dialkyl phenol sulfide will be removed along with the liquid. It may then be necessary to adjust the amount of the dialkyl phenol sulfide in the polymer prior to subjecting it to further use, such as thermal processing operations as milling or injection molding wherein it is to be protected from adverse effects by the presence of the dialkyl phenol sulfide. This discussion of the use of dialkyl phenol sulfides in solvents used in washing polymer are likewise applicable to any solvents employed with polymers made using catalysts other than Ziegler, such as those of the Phillips Petroleum Company and Standard of Indiana as described herein. In such processes, often the entire amount of polymer is dissolved in a hot hydrocarbon solvent to separate same from the bulk or all of the catalyst and in such instances it is often desirable to have a portion or all of the dialkyl phenol sulfide to be employed, present in the solvent so used.

In addition to the disclosures of Ziegler catalysts given above in detail and by reference to various patents, attention is directed to Du Pont Italian Patents 546,858, 549,915, 549,009, the disclosures of which are hereby incorporated herein by reference. They describe the polymerization of a variety of α-monoolefin hydrocarbons having a single hydrogen on β-carbon, e.g., butene-1, hexene-1, tetradecene-1, propylene, alone or together either with other such monomers or with other ethylenically unsaturated comonomers, employing "coordination catalysts." Among the catalysts disclosed are those obtained by reacting $TiCl_4$ with LiAl tetraalkyls, divalent titanium or zirconium combined with organic compounds containing ethylenic unsaturation, the divalent titanium or zirconium being prepared by reducing higher valency titanium or zirconium compounds, e.g., those containing radicals such as alkyl, alkoxy, or halogen, by reducing agents such as Grignard reagents, metal alkyls or aryls and similar organometallic compounds, zinc metal and metals above zinc in the electromotive series, metal hydrides; catalysts prepared by reducing a compound of a metal, such as Ti, Zr, Ce, V, Nb, Ta, Cr, Mo, W, employing as reducing agents organometallic compounds having at least one metal-hydrocarbon bond. The present invention contemplates protecting, by incorporating sulfides of dialkyl phenols therein, polymers of α-monoolefin hydrocarbons having a single hydrogen on β-carbon, said polymers in unoriented from exhibiting crystallinity by X-ray diffraction, that have been prepared through the agency of such catalysts as are disclosed in the aforementioned Du Pont Italian patents.

Another important group of catalysts useful under suitable conditions for producing crystalline polymers of α-monoolefin hydrocarbons having a single hydrogen on β-carbon are those commonly termed the Phillips catalysts, e.g., as described in Australian patent applications 864/54, 10670/55, and 6365/55, the disclosures of which are incorporated herein by reference. (Phillips' Belgian Patents 530,617, and 535,082 correspond respectively to their Australian application 864/54 and 6365/55.) These comprise chromium oxide, at least part of which is in the hexavalent state, supported on at least one oxide selected from the group consisting of silica, alumina, thoria, and zirconia. The catalyst can be promoted, for example, with strontium oxide. As disclosed in Australian 10670/55, the polymerization is effected in the presence of a liquid inert solvent, such as iso-octane, and a mixture of solvent, polymer and catalyst is separated from the reaction zone, heated to a higher temperature so that a substantial portion of the polymer is dissolved in the liquid phase, and the catalyst is separated from such liquid phase from which the polymer is then recovered.

Still another series of catalysts capable of producing under suitable conditions crystalline polymers of α-monoolefin hydrocarbons having a single hydrogen on β-carbon, have been described by the Standard Oil Company of Indiana. Most of these catalysts are oxides of Group VI of the Periodic System, especially chromium, molybdenum, or tungsten, partially reduced prior to use, as by treating with reducing gases at elevated temperatures, and various reducing agents or activating agents are described such as metal alkyls, lithium aluminum hydride, alkaline earth metals, calcium carbide, alkali metal hydrides, alkali metals; it should be mentioned that the Group VI oxides are generally supported on Group IV oxides such as alumina, titania, or zirconia. Among the said Standard of Indiana patents may be mentioned for example U.S. Patents 2,710,854, 2,717,888, 2,712,889, 2,726,231, 2,731,453, and those listed in Chemical Week, August 4, 1956, pp. 89–90. Although various of these Standard of Indiana catalysts have been used at temperatures well above 100° C., it is preferred to employ those that are active at 100° C. and below. As in the case of the Phillips catalysts, the polymerization is preferably carried out in the presence of inert organic solvents, and polymer accumulated on catalyst is dissolved off by the use of such solvents.

The "alfin" catalysts have been reported capable of producing crystalline polystyrene, hence may also be capable of producing crystalline polymers of other α-monoolefin hydrocarbons having a single hydrogen on β-carbon, e.g. propylene, etc. The "alfin" catalysts are generally a combination of an alkali metal alkoxide derived from a methylalkyl carbinol, the alkali metal preferably being sodium.

Most of the processes known to date to give stereospecific polymers act through heterogeneous catalysis. However, any polymerization system can be employed which causes the α-monoolefin hydrocarbon as described herein to polymerize in stereospecific form which permits crystallization of the polymer.

It is not necessary that a single α-monoolefin hydrocarbon of the type described be polymerized, but mixtures of any two or more of the same in all proportions can be polymerized with each other. With any of same there can also be included other ethylenically unsaturated monomers copolymerizable therewith, e.g., ethylene, vinyl ethers, so long as their nature or their amount, usually minor, are not such as to destroy the activity of the catalyst or prevent the stereospecific polymerization from occurring. For example, ethylene, even in considerable amounts, can be copolymerized with propylene, butene-1, styrene and the like with Ziegler or other catalyst systems of the type described, and so long as the resulting polymer exhibits some crystallinity by X-ray diffraction by virtue of the propylene, butene-1, styrene, etc. having been incorporated into the polymer molecules in stereospecific and thus crystalline form, such polymers are protected against thermal processing by dialkyl phenol sulfides as dsecribed herein.

In order to illustrate some of the various aspects of the invention, and serve as a guide in applying the invention, the following specific examples are given. It will, of course, be understood that variations from the particular conditions, monomers, catalysts, dialkyl phenol sulfides, and proportions of same, can be made without departing from the invention.

EXAMPLE 1

Propylene was polymerized with Ziegler catalyst in the following manner. Into a 2-liter stirred autoclave containing 1 liter heptane, there was introduced titanium tetrachloride, and then triisobutylaluminum with stirring, at room temperature. Amounts used were such as to provide 30 millimoles titanium per liter, and an aluminum to titanium mole ratio of 3. After 15 minutes, the autoclave was pressured with propylene. The polymerization was carried out at 31 to 38° C. and at pressures varying from 78 to 5 pounds per square inch gauge. After 45 minutes, excess propylene was bled off and the reaction mixture was diluted with an equal volume of isobutanol. The resulting polymer slurry was filtered, and the polymer reslurried twice with isobutanol, once at room temperature and once at reflux; it was filtered after each reslurrying. After air drying, there was obtained 158 grams polypropylene.

The polypropylene thus isolated, which was a mixture of crystalline (sometimes called "isotactic") polypropylene and amorphous polypropylene, was estimated by X-ray diffraction measurements to be about 20 percent crystalline. One sample, without addition of any material, was milled for 5 minutes on mill rolls having a surface temperature of 220° C.; this was the control. Another sample, containing 0.1 weight percent di(1-hydroxy-3-methyl-6-tert.-butylphenyl)monosulfide (since the sulfur bridge was para to the hydroxyl groups, this can also be named 4,4'-thiobis-(3-methyl-6-tert.-butylphenol, or 4,4'-thiobis-(6-tert.-butyl-m-cresol), sold commercially under the registered trademark "Santowhite Crystals," was likewise milled 5 minutes on mill rolls having a surface temperature of 220° C.

Results are presented in Table I. The control sample underwent severe chain scission, as evidenced by its specific viscosity of less than half that of the protected sample and its melt index many times higher than that of the protected sample. Further, while its tensile elongation increased, its tensile strength especially at yield suffered quite considerably, indicating that a reduction in molecular weight and crystallinity had occurred.

TABLE I.—*Effect of 5 minutes hot milling on polypropylene (20% crystalline)*

| | Density | Sp. Visc. | Tensile Properties | | | | Melt Index (at 220° C.) |
|---|---|---|---|---|---|---|---|
| | | | Strength, p.s.i. | | Elong., percent | | |
| | | | Yield | Break | Yield | Break | |
| Control (no additive) | 0.8830 | 0.124 | 1,153 | 1,464 | 44 | 736 | 22 |
| Stabilized (0.1% "Santowhite Crystals" ® [1]) | 0.8818 | 0.299 | 1,361 | 1,779 | 61 | 434 | 0.27 |

[1] Di(1-hydroxy-3-methyl-6-tert.-butylphenyl)monosulfide.

EXAMPLE 2

In the same general manner of Example 1 but in a 1-liter stainless steel autoclave containing 500 cc. kerosene, propylene was polymerized in the presence of catalyst obtained by the interaction of triisobutylaluminum with titanium tetrachloride, at a concentration of 30 millimoles titanium per liter and an aluminum to titanium mole ratio of 3. The pressure was 110 p.s.i. gauge, the temperature 68° C., and the time 55 minutes. After excess propylene was removed, the total reaction mixture was filtered. The undissolved polymer was then treated with 500 cc. isobutanol, filtered, and reslurried twice with isobutanol, once at room temperature and then at reflux. The final air-dried polymer weighed 27 grams.

The polypropylene thus prepared was estimated by X-ray diffraction measurements to be about 40% crystalline. Filtering the slurry of polymer in kerosene, prior to adding isobutanol, permitted an appreciable proportion of the amorphous polypropylene to be carried away in solution in kerosene.

The response to 5 minutes milling at 190° C. both without any additive (control) and with 0.1 weight percent "Santowhite Crystals," was determined as in Example 1. The data, presented in Table II, show the excellent protective effect of the "Santowhite Crystals." The unprotected control suffered in the same manner as the polypropylene in Example 1, but to an even greater extent.

TABLE II.—*Effect of 5 minutes hot milling on polypropylene (40% crystalline)*

| | Density | Tensile Properties | | | | Melt Index (220° C.) |
|---|---|---|---|---|---|---|
| | | Strength, p.s.i. | | Elong., percent | | |
| | | Yield | Break | Yield | Break | |
| Control (no additive) | 0.9021 | 3,355 | 2,194 | 20 | 150 | 15.4 |
| Stabilized (0.1% "Santowhite Crystals" ®) | 0.9018 | | 4,469 | | 40 | 0.08 |

EXAMPLE 3

Crystalline (so-called "isotactic") polystyrene was prepared, in the essential absence of solvent, by polymerizing styrene in the presence of a catalyst prepared from titanium tetrachloride and triethylaluminum, at atmospheric pressure and 39 to 57° C. The mole ratio of aluminum to titanium in the catalyst was 3.0, and the concentration of titanium was 9 millimoles per liter of styrene charged. After 4 to 5 hours of polymerization, a quantity of methanol approximately equal in weight to the styrene was added to the reaction mixture. The resulting slurry of polystyrene was filtered, washed with acetone, reslurried twice, first at room temperature and then at an elevated temperature, and finally washed with water on the filter. The polystyrene was then dried 14 hours at 110° C. at 3 mm. Hg absolute pressure.

When examined on a Kofler hot stage of a polarizing microscope, the polystyrene crystallites were observed to melt at 229° C. From 15 to 20 percent of the polymer could be extracted from the remaining polymer by treatment with refluxing methyl ethyl ketone, or with cold carbon tetrachloride over an extended period of time.

The stability of the crystalline polystyrene prepared as described above, both with and without "Santowhite Crystals" ® against the effect of thermal processing was determined by aging in an air oven. Fifteen grams of the crystalline polystyrene was dissolved in 150 milliliters benzene in a pressure bomb maintained at 180° C. for 4 hours. The resulting solution was removed from the bomb and cooled. Into a 50 milliliter portion of the resulting jelly-like solution was stirred 0.005 gram "Santowhite Crystals," which is 0.1 weight percent based on the polystyrene. With a draw knife, a film of the thus-stabilized crystalline polystyrene and a film of the non-stabilized crystalline polystyrene, were cast on glass plates. The plates were held at 65° C. for 24 hours to remove the solvent and give cast films of the polymer. The films thus prepared were removed, placed on another glass plate, and placed in an air oven held at 152° C. They were maintained in this oven for 66 hours. A 0.1000 gram sample of the crystalline polystyrene film thus aged and which contained no additive, and a sample of equal weight of the crystalline polystyrene film thus aged and which had been protected with 0.1 weight percent "Santowhite Crystals," were separately dissolved under pressure in 100 ml. portions of chlorobenzene for 1½ hours at 190° C. The resulting solutions were then employed for measuring the specific viscosity of the respective polymer samples.

The specific viscosity of the crystalline polystyrene that had been stabilized with "Santowhite Crystals" prior to the oxidative heat treatment in the air oven, was 0.141. In contrast, the specific viscosity of the crystalline polystyrene that had not been stabilized before its oxidative heat treatment in the air oven, was 0.130. This clearly demonstrates that the unprotected sample underwent considerably more chain scission than did the protected sample.

This application is a continuation-in-part of our copending application Serial No. 532,365, filed September 2, 1955, now U.S. Patent 2,985,617, issued May 23, 1961.

While the invention has been described with particular reference to preferred embodiments thereof, it will be appreciated that variations from the details given herein can be effected without departing from the invention in its broadest aspects.

We claim:

1. A polymer of an α-monoolefin hydrocarbon having a single hydrogen on β-carbon, said polymer in unoriented form exhibiting crystallinity by X-ray diffraction, containing a small amount of a sulfide of a dialkyl phenol.

2. Polymer according to claim 1 having a crystal melting point within the range of 100 to 250° C.

3. Polymer according to claim 1 obtained through the agency of a Ziegler polymerization catalyst adapted for the low pressure polymerization of ethylene.

4. Polymer according to claim 3 wherein said catalyst has been prepared by the interaction of a trialkylaluminum with a titanium halide.

5. Polymer according to claim 1 obtained through the agency of a polymerization catalyst comprising hexavalent chromium oxide supported on a material comprising at least one of the group consisting of alumina, silica, zirconia and thoria.

6. Polymer according to claim 1 obtained through the agency of a polymerization catalyst comprising molybdenum oxide supported on a material comprising at least one of the group consisting of alumina, titania and zirconia and partially pre-reduced by a reducing gas at an elevated temperature.

7. Polymer according to claim 1 wherein said sulfide of a dialkyl phenol is a monosulfide.

8. Polymer according to claim 1 wherein said sulfide of a dialkyl phenol is a sulfide of a monohydric dialkyl phenol in which a carbon atom of each of two nuclei of the phenol are joined together by less than three sulfur atoms and the alkyl groups contain less than six carbon atoms and at least one alkyl group is a branched chain alkyl group and which is unsubstituted, except for sulfur, in two of the positions ortho- and para- to the hydroxy group.

9. Polymer according to claim 8 wherein said sulfide of a dialkyl phenol is di(1-hydroxy-3-methyl-6-tert.-butylphenyl) monosulfide.

10. Polymer according to claim 1 wherein said sulfide of a dialkyl phenol is present in an amount within the range of 0.005 to 5 weight percent.

11. Polymer according to claim 1 wherein said hydrocarbon is propylene.

12. Polymer according to claim 1 wherein said hydrocarbon is butene-1.

13. Polymer according to claim 1 wherein said hydrocarbon is styrene.

14. Crystalline polypropylene containing a small amount of a monosulfide of a dialkyl phenol sufficient to reduce scission of polymer chains on thermal processing of said polypropylene.

15. Crystalline polystyrene containing a small amount of a monosulfide of a dialkyl phenol sufficient to reduce scission of polymer chains on thermal processing of said polystyrene.

16. Crystalline polypropylene containing from 0.01 to 0.5 weight percent di(1-hydroxy-3-methyl-6-tert.-butylphenyl) monosulfide.

17. Crystalline polystyrene containing from 0.01 to 0.5 weight percent di(1-hydroxy-3-methyl-6-tert.-butylphenyl) monosulfide.

18. A method of protecting a polymer of an α-monoolefin hydrocarbon having a single hydrogen on β-carbon, said polymer in unoriented form exhibiting crystallinity by X-ray diffraction, against adverse effects of thermal processing which comprises intimately incorporating therein prior to completion of said thermal processing a small but protective amount of a sulfide of a dialkyl phenol.

19. A composition of matter consisting essentially of crystalline polypropylene and from 0.03% to 1.5% by weight of 4,4'-thio-bis-(6-tert.-butyl-m-cresol).

References Cited by the Examiner

UNITED STATES PATENTS

| 2,824,090 | 2/58 | Edwards et al. | |
| 2,833,755 | 5/58 | Coover. | |
| 2,940,949 | 6/60 | Mullin | 260—45.95 |
| 2,985,617 | 5/61 | Salyer et al. | 260—45.95 |

FOREIGN PATENTS

| 201,160 | 1/56 | Australia. |
| 211,963 | 12/55 | Australia. |

OTHER REFERENCES

Monsanto Australian abstract 4110/4, July 19, 1955, 1 page.

Natta: "Makromol Chemie," vol. 16 (1955), pp. 213–37.

Raff et al.: "Polyethylene," Interscience (received October 1956), pages 79–81 and 106.

LEON J. BERCOVITZ, *Primary Examiner.*

H. N. BURSTEIN, A. M. BOETTCHER, A. D. SULLIVAN, J. R. LIBERMAN, WILLIAM H. SHORT,
*Examiners.*